Figures 15, 16, 17, 18:
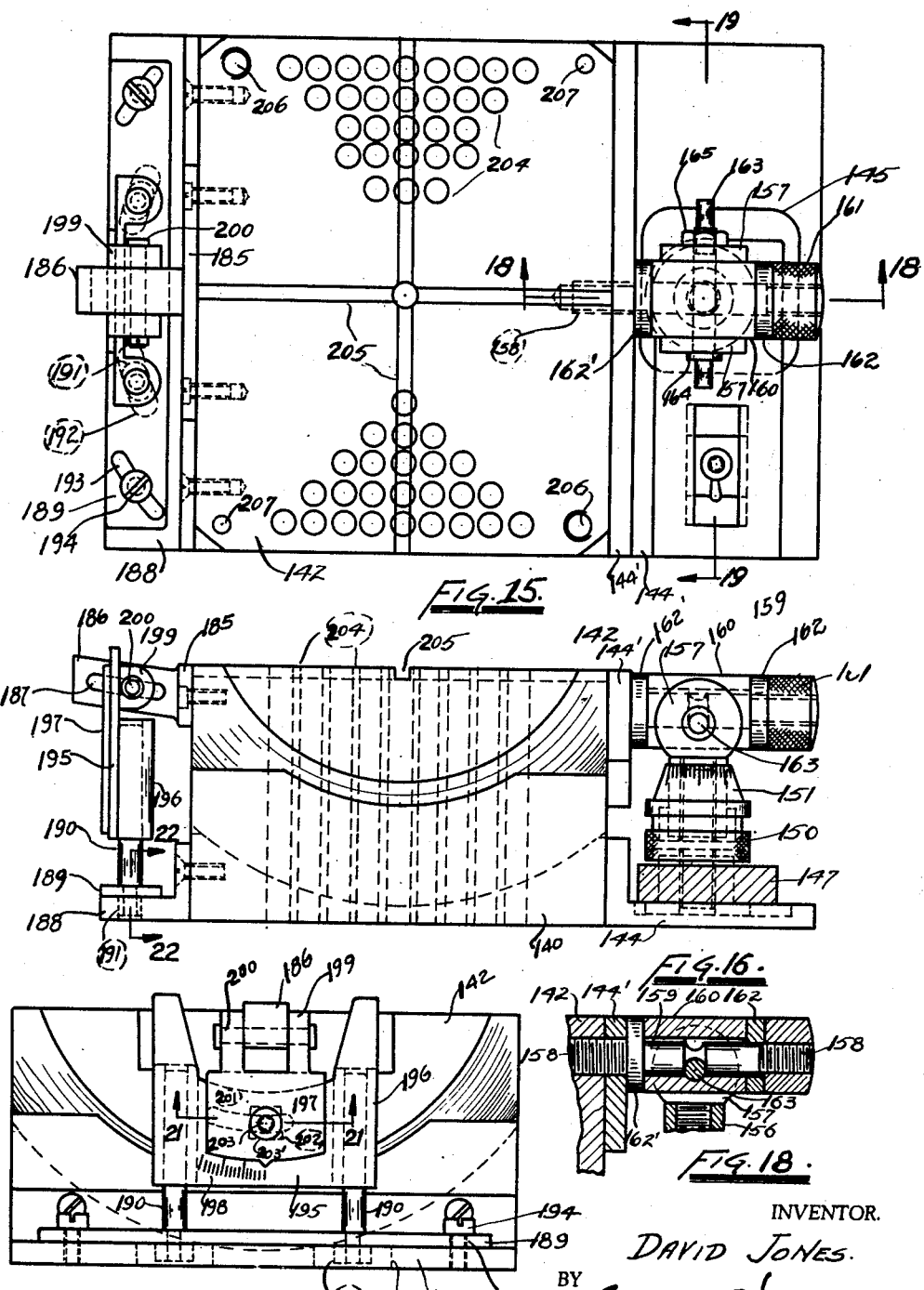

Sept. 19, 1939.                     D. JONES                       2,173,519
                          TRIGONOMETRIC ANGLE GENERATOR
                             Filed Nov. 2, 1936           4 Sheets-Sheet 1
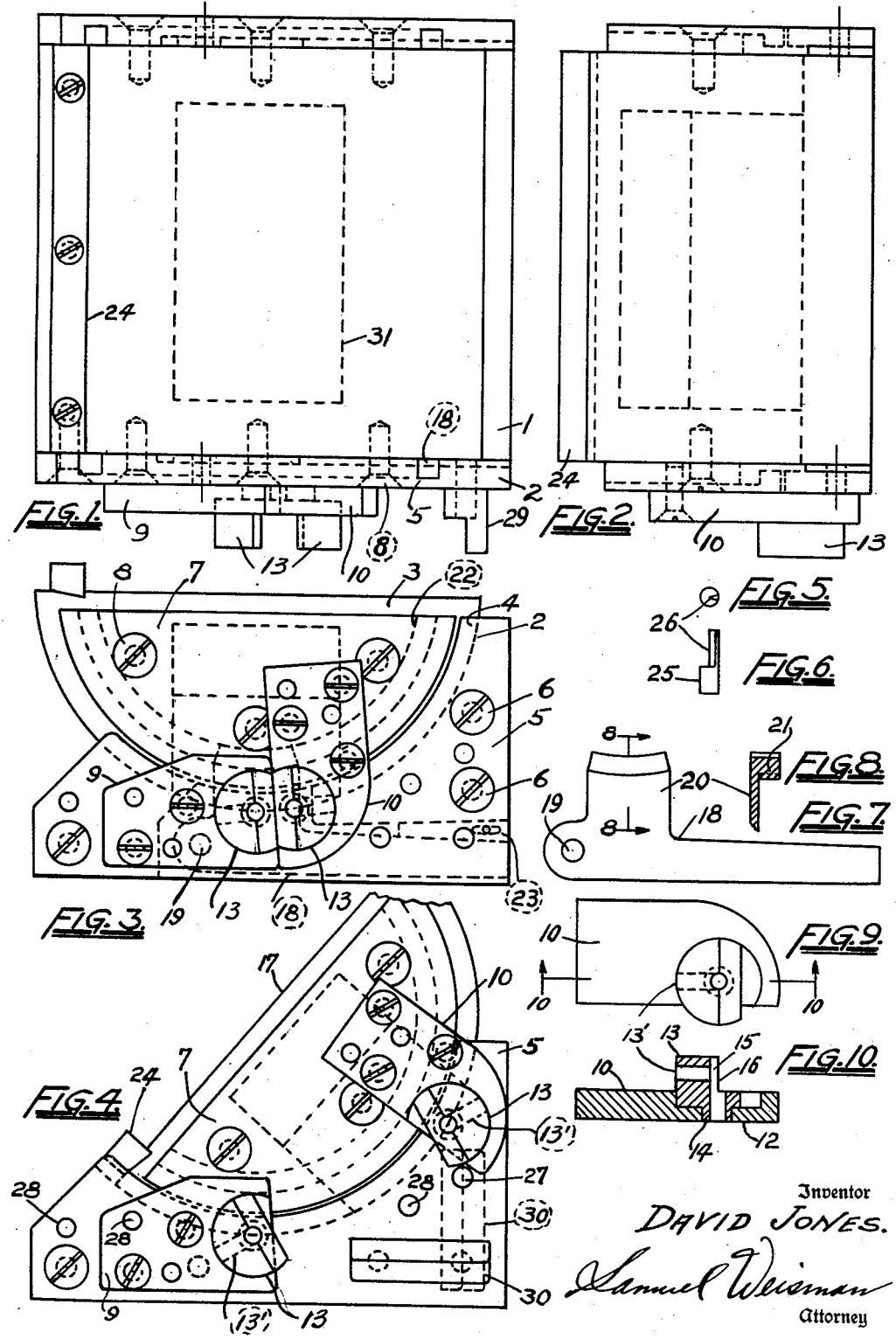
Inventor
DAVID JONES.
Samuel Weisman
Attorney Sept. 19, 1939.  D. JONES  2,173,519
TRIGONOMETRIC ANGLE GENERATOR
Filed Nov. 2, 1936  4 Sheets-Sheet 2
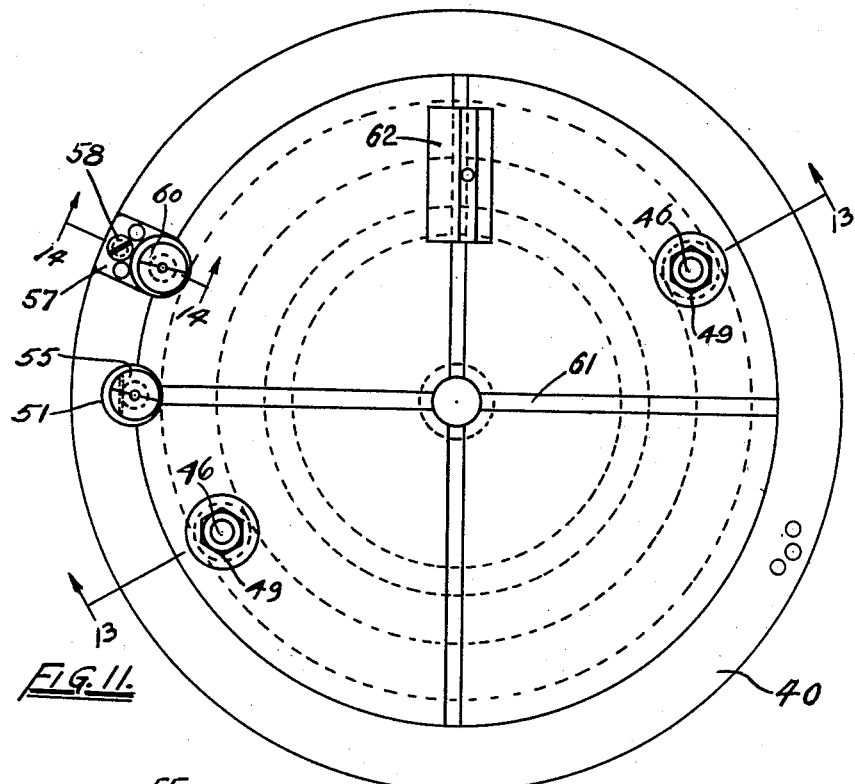
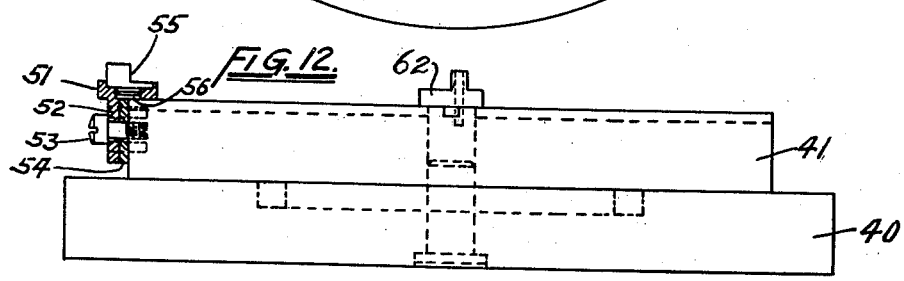
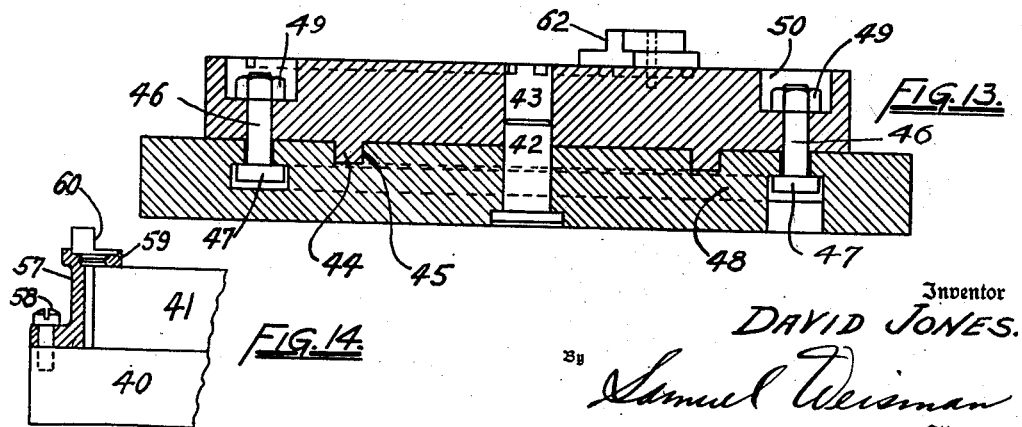
Inventor
DAVID JONES.
By Samuel Weisman
Attorney Sept. 19, 1939.  D. JONES  2,173,519

TRIGONOMETRIC ANGLE GENERATOR

Filed Nov. 2, 1936  4 Sheets-Sheet 3

INVENTOR.
DAVID JONES.
BY Samuel Weisman
ATTORNEY.

Sept. 19, 1939.  D. JONES  2,173,519
TRIGONOMETRIC ANGLE GENERATOR
Filed Nov. 2, 1936   4 Sheets-Sheet 4
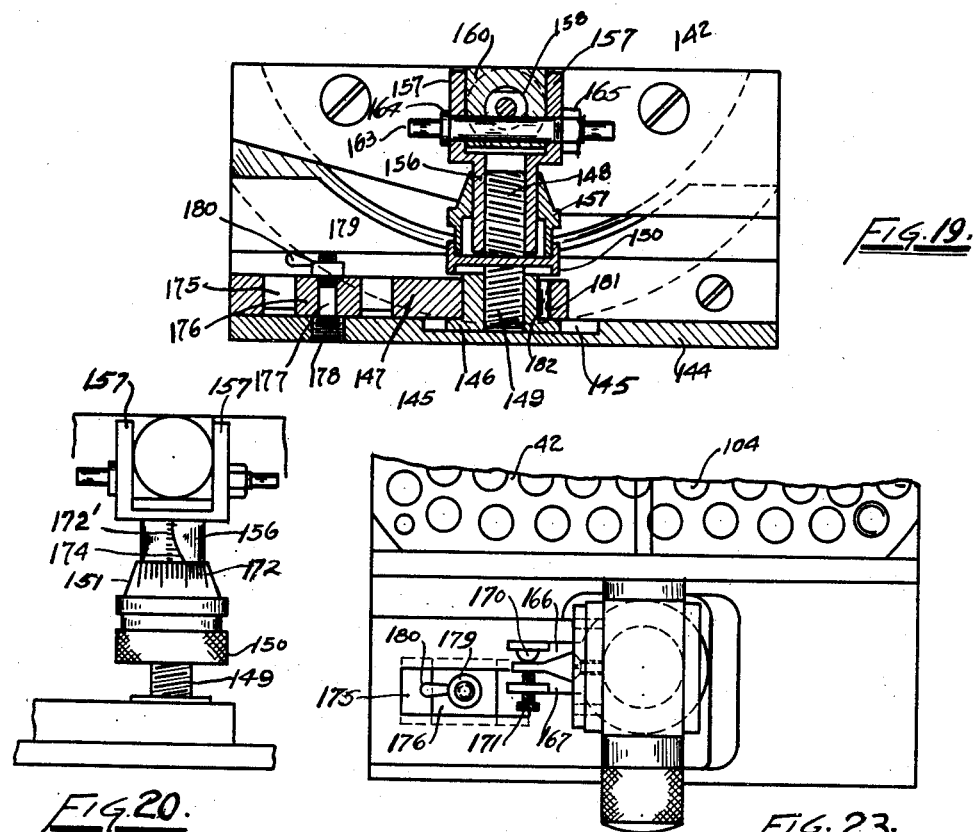
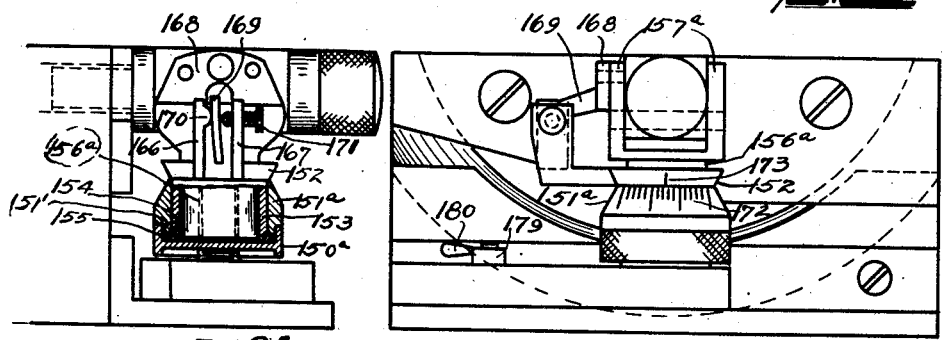
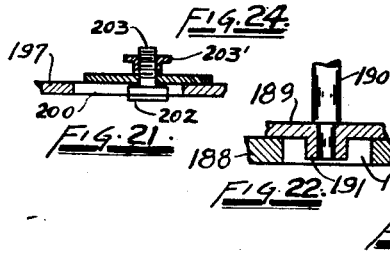
INVENTOR.
DAVID JONES.
BY
Samuel Weisman
ATTORNEY.

Patented Sept. 19, 1939

2,173,519

UNITED STATES PATENT OFFICE 2,173,519

TRIGONOMETRIC ANGLE GENERATOR

David Jones, Detroit, Mich.

Application November 2, 1936, Serial No. 108,746

5 Claims. (Cl. 33—174)

The present invention pertains to a novel angle generator for setting a working surface accurately to a desired angular adjustment and also to measure the angle when the working surface has been caused to assume a given set position.

The device, in at least one embodiment, comprises cylindrical convex and concave members fitted one within the other and on a common axis of rotation. One or more gauge retainers attached respectively to the concave or convex members at a previously calculated distance from the axis of rotation provide a means for holding gauging members between which gauge blocks may be inserted for making an accurate angle adjustment. The adjustment involves a simple trigonometric method that is fully described in the detailed description. Further, the invention includes a simple means for locking the movable part in the desired position of adjustment.

The principles utilized in the device consisting of concave and convex members are also embodied in a modification of the invention where the angular adjustment is made completely in one plane, such as a table rotatably mounted on a base. In still another embodiment of the invention, the upper or movable member is adapted for angular adjustment to the horizontal in two directions. This device also includes means whereby these angular adjustments are indicated in degrees, minutes and seconds, and also means for locking the upper member in the desired adjustment. Further, both members are rotatable together in a transit movement, whereby the adjusted working surface may be turned on a substantially vertical axis.

In all embodiments of the invention the top and bottom parts of the angle generator are preferably made from magnetic jig blocks, and the device may be used in connection with other magnetic jig blocks of standard angles. These parts of the angle generator may however be non-magnetic inasmuch as the work may be secured thereto by other than magnetic means.

The invention is fully disclosed by way of example in the following description and in the accompanying drawings in which Figure 1 is a plan view of the device.
Figure 2 is a rear elevation.
Figure 3 is an end view.
Figure 4 is an end view, showing the device in an adjusted position.
Figure 5 is an end view of a knife-edge gauging pin.
Figure 6 is an elevation thereof.
Figure 7 is an elevation of the locking lever.

Figure 8 is a section on the line 8—8 of Figure 7.
Figure 9 is an elevation of one of the gauge retainers with a gauging member inserted therein.
Figure 10 is a section on the line 10—10 of Figure 9.
Figure 11 is a plan view of a modification.
Figure 12 is a side elevation thereof partly in section.
Figure 13 is a section on the line 13—13 of Figure 11.
Figure 14 is a detail section on the line 14—14 of Figure 11.
Figure 15 is a plan view of another modification.
Figure 16 is a side elevation thereof.
Figure 17 is an end view thereof.
Figures 18 and 19 are sections on the lines 18—18 and 19—19 of Figure 15.
Figure 20 is a detail front view.
Figure 21 is a section on the line 21—21 of Figure 17.
Figure 22 is a section on the line 22—22 of Figure 16.
Figure 23 is a fragmentary plan view of another modification.
Figure 24 is a side elevation thereof.
Figure 25 is a front view thereof, and
Figure 26 is a detail elevation.

Reference to these views will now be made by use of like characters which are employed to designate corresponding parts throughout.

The device as shown in Figures 1 to 10 comprises a concave base member 1 in which is formed a cylindrical surface 2. On the base member is mounted a relatively movable connex member 3 having a convex cylindrical surface 4 complementary to the surface 2.

An end plate 5 is fastened to each end of the base 1 by screws 6. Similarly, an end plate 7 is secured to each end of the movable member 3 by screws 8. At one end of the device, the plate 5 carries a gauge retaining member 9, and the corresponding plate 7 carries a similar member 10. Each of the retaining members 9 and 10 is counter-sunk at 11 and drilled at 12 to receive the correspondingly shaped inner-end of a gauging member 13. This member, except for its inner-end 14 rotatably mounted in the counter-sink 11 and hole 12, is of semi-cylindrical shape and drilled with an axial hole 15 as may be seen in Figures 9 and 10. The flat diametrical face 16 of each member 13 constitutes a gauging surface in the manner presently to be described.

The movable member 3 may be turned within the member 1 so that its upper face 17 may be adjusted to any desired angle to the horizontal, as illustrated in Figure 4. The adjustment is secured by means of the locking lever 18 illustrated in Figures 7 and 8. This lever is in the nature of a bell crank, with one end pivotally attached to the plate 5 or 9 at the point 19. The power arm 20 of the lever has an inwardly extending arcuate flange 21 received freely in a groove 22 cut in the adjacent end of the member 3. When the adjustment of the member 3 has been made, the lever 18 is tilted by any suitable means such as a wedge 23, whereupon the flange 21 locks in the groove 22 and maintains the member 3 in the adjusted position.

The member 3 is initially set to the desired angular adjustment by use of the gauging members 13 and Johansson blocks fitted between the gauging surfaces 16 which are brought into full contact with the ends of the blocks by turning the members 13. The distance between the two opposed surfaces 16 is equal to twice the sine of one-half the desired angle of rotation, considering the radius of the concave and convex surfaces to be unity. Thus, by the use of Johansson blocks and a table of natural trigonometric functions, a highly accurate angular adjustment of the surface 17 may be made. One edge of this surface carries a liner rail 24 to aid in supporting the work.

The members 13 are bored radially at 13' to receive a rod (not shown) extending through both members and holding their faces 16 at all times parallel to each other. The other end of the device may be similarly equipped with gauging members and a rod and further with means for screwing the rod through the members. Thus, after the surfaces 16 at one end have been adjusted approximately to a group of Johansson blocks at one end, the accurate adjustment is made by screwing the rod at the other end.

In some cases it may be preferable to gauge between sharp edges or cylindrical gauging surfaces rather than between the surfaces 16. Accordingly, there are provided pins 25 adapted to be inserted in the holes 15 of the members 13. The upper portion of each pin is shaped to a sharp edge 26 as shown in Figures 5 and 6. The distance between the surfaces 16, and particularly between the edges 26, may be measured by other means than the Johansson blocks, if desired. Such means may be a ruler, vernier or equivalent device graduated to give the corresponding angular reading.

The members 5, 9 and 10 are provided with properly located dowel holes 27 and dowel pins 28 for gauging by other means. For example, as shown in Figure 4, gauge blocks 29 and 30 may be attached to the plate 5, one vertical and the other horizontal, so that the surfaces 16 of members 13 may be located with reference to these blocks, if desired, in making the adjustment of the movable member 3.

The parts 1 and 3 are preferably made from magnetic jig blocks generally similar to those shown in my United States Patent No. 1,895,129 of January 24, 1933. In such case, a chamber 31 may be cut in the member 3, below its surface 17, to receive permanent or separately energized magnets to hold the work in position. However, if desired, the parts may be made from suitable castings or commercial materials.

The construction shown in Figures 11 to 14 is for making an angular adjustment entirely in a horizontal plane. This device comprises a base 40 on which is mounted a rotary table 41. The latter is centered by means of a post 42 fitted in the center of the base 40 and projecting into a hole 43 in the center of the table. The table is further guided by means of a circular rib 44 formed on its lower surface and received in a circular groove 45 cut in the top of the base. When the desired adjustment of the table has been made, it is secured by means of bolts 46 carried by the table and having their lower ends formed with heads 47 received in an inverted T-slots 48 cut in the base 40. The upper ends of the bolts carry nuts 49 accommodated in recesses 50 in the top of the table.

The rotary table 41 carries one or more devices for providing gauging surfaces similar to the surfaces 16 previously described. Each such device comprises a bearing member 51 mounted over the edge of the table and having a depending shank 52 secured to the table by a screw 53, with an adapter 54 interposed. In the bearing is mounted a semi-cylindrical member 55 with a reduced circular stem 56 suitably secured in the bearing and at the same time permitting rotation of the member 55.

To cooperate with the members 55 on the rotary table, the base 40 carries one or more gauge members in the manner illustrated in Figure 14. Each gauge device comprises a retainer 57 secured to the base by a screw 58 and having a bearing portion 59 projecting over the top of the table 41. In the bearing 49 is rotatably mounted a semi-cylindrical gauge member 60. The flat surface of the relatively movable gauge members 55 and 60 are adapted to receive Johansson blocks between them to effect an angular adjustment of the table 41 relatively to the base 40 according to the trigonometric method previously described.

The top of the table 41 is further formed with diametrical grooves 61 perpendicular to each other and slidably receiving one or more gauging blocks 62. The latter may be used instead of the members 55, if desired, in making an adjustment with reference to the relatively stationary gauge members 60.

The devices shown in Figures 1 to 14 may also be used in determining the angular relation between the relatively movable parts when the movable member assumes a position as a result of predetermined or arbitrary conditions. When so used, the angle between the relatively movable parts is measured by the insertion of blocks between the gauging surfaces and reversing the calculation previously described, that is, determining the angle from the sine.

The angle generator shown in Figures 15 to 22 includes a base member 140 in the top of which is formed a spherical cavity at 141. In the cavity is seated an adjustable top member 142, the bottom of which is formed as a spherical surface 143 having the same radius as the surface 141.

To one end of the member 140 is secured an angle piece 144 having its bottom surface in the same plane as the bottom surface of the member 140. The angle piece is formed with a cavity 145 (Figure 19) for a purpose presently to be described. In the bottom of the cavity is seated a flanged nut 146 which in turn passes through a plate 147 slidably mounted on the member 144. In the nut is threaded an upright screw having opposite threads 148 and 149 respectively above and below a knurled adjusting collar 150 integral with the screw. Upon the collar 150 and surrounding the screw is mounted a graduated ring 151 having a press fit or otherwise secured in the collar 150.

On the threads 149 is mounted a nut 156 having a pair of spaced upstanding ears 157. A stud 158 is screwed through a plate 144' mounted on the member 142 and into the member 142 and has a blank intermediate portion 159 on which is rotatably mounted a bearing block 160 fitted between the ears 157. On the outer threaded end of the stud 158 is a knurled nut 161. A washer 162 is mounted on the stud 158 at one end of the block 160 and in engagement with the nut 161. A collar 162' is formed on stud 158 at the other end of block 160 and engages the vertical side of the angle plate 144'. A swivel and gauge pin 163 is passed through the ears 157 and block 160, crossing the bolt 158. Pin 163 has a collar 164 at one side of the block and a nut 165 tightened against the other side. Thus, the adjustable screw 148, 149 and nuts 145, 146 with graduated collar 151, 152 may swivel on pin 163 in order to return to perpendicular position when spherical member 142 is tilted to the desired angle.

In the modification, shown in Figures 23 to 26, a collar 152, for a purpose presently to be described, is positioned above the ring 151a and has a skirt 153 extending into the collars 151a and 150a. The lower end of the skirt 153 is undercut at 154 to receive a securing ring 155 fastened thereon and resting upon the web of collar 150. The lower end of ring 151a is reduced at 51' and sweated into collar 150a. The reduced end 151' loosely surrounds the ring 155, whereby the collar 152 remains free for relative rotation on nut 156a.

A pair of spaced fingers 166 and 167 extend radially outward and then upward from the member 152. To one of the ears 157 is secured a plate 168 from which extends a finger 169 into the space between the members 166 and 167. The sides of the finger 169 have a predetermined irregular shape for a purpose to be presently described. The inner face of the member 166 has a rounded nub 170 engaging one side of the finger 169. The other side of finger 169 follows the shape of the first side and is engaged by the round end of a screw 171 mounted in the finger 167.

It may now be seen that, on turning the screw 148, 149, in either modification, the upper plate 142 may be raised or lowered, and the angle of its flat surface varied by the rocking movement of member 142 on the base 140. The ring 151 or 151a is graduated at 172 in minutes and seconds of a degree, the graduations being referred to an index mark 173 on the ring 152a. The graduations represent, actually, threads on the screw 148, 149 or distances along the length of the screw. Since the elevation of the plate 142 at the bolt 158 is not proportional to the angle of its surface, a correction must be introduced. This is done by means of the irregular finger 169 which causes a corresponding rotational shift of the ring 152 and its index line 173 as the elevation of the double screw 148, 149 and the member 142 varies. It is to be noted in this connection that the graduated ring 151 or 151a is secured to and turns with the ring 150 or 150a.

In the first described construction the correction is effected by means of a varying index line 174 scribed on the nut 156. This nut, as well as the nut 156a, is calibrated vertically at 72' in angles beyond the range of the calibrating 172.

Another means of introducing the correction is to calibrate the graduations 172 so that they read accurately in terms of the angular position of the top member 142 rather than in terms of distance along the screw 148, 149.

The block 147 has a slot 175 (Figure 19) in which is slidably mounted a shoe or guide block 176. A bolt 177 passes through the shoe 176 and has its lower end threaded or otherwise fastened at 178 in the member 144. The upper end has a nut 179 threaded thereon over the shoe 176 and formed with a small finger piece 180 for easy adjustment. When the nut 179 is loose, the screw 148, 149 may shift along the recess 145 in response to tilting of the member 142 on the member 140. After the adjustment has been made, it is secured by tightening the nut 179 to secure the blocks 147 and 176 to the member 144.

A dowel pin 181 in the block 147 extends into a vertical slot 182 in the nut 146 to permit intermediate vertical shifts of the nut assembly without permitting rotation thereof to destroy the angular adjustment at the graduations 172.

At the opposite end of the member 142 is fastened a strip or plate 185 from which extends a guide finger 186 having an inclined slot 187. At the corresponding end of the base 140 is secured an angular base plate 188 similar to the member 144 at the opposite end. On the plate 188 is mounted an adjustable plate 189 carrying a pair of guide pins 190 fixed thereto. At the lower surface of plate 189 are formed arcuate bosses 191 adapted to travel in arcuate slots 192 in the plate 188. The adjustable plate 189 has arcuate slots 193 through which are passed lock screws into plate 188, whereby a selected adjusted position of plate 189 may be fixed as will presently appear.

A graduated plate 195 has bosses 196 slidably received on the guide pins 190. An index pointer apron 197 co-operating with the graduations 198 on the plate 195 is suspended from the member 186 by a pair of ears 199 straddling the member 186 and attached thereto by a pin 200 passed through the ears and the slot 187.

Behind the apron 197, the plate 195 has an arcuate slot 201 concentric with the spherical surfaces. A guide shoe 202 travels in the slot and is attached to the apron by a screw 203 and nut 203' which is also used to clamp the shoe and apron in any selected position along the slot 201, thereby locking the member 142 after it has been tilted to the desired angle.

The determination of an angle by tilting the member 142 on an axis parallel to the pin 163 has already been described. In this connection, the pin provides points for measuring and checking elevations or sine distances from the horizontal surface of the member 144. The adjustment to this angle causes a vertical rocking movement of the finger 186, which is permitted by the slot 187. At the same time, the graduated plate 195 and apron 197 are carried vertically, and this movement is permitted by the slidable mounting of the plate on the guide pins 190. The transverse angle of the top member 142 is introduced by turning the member on an axis substantially parallel to bolt 158 after loosening the nut 179 as previously stated. This angle is measured, at least for trial purposes, by the position of the pointer apron 197 on the graduations 198. After setting this angle, it may be necessary or desirable to turn the member 142 in a transit motion about its vertical diameter.

This transit movement becomes possible on loosening the screws 194, whereupon they and the guide pin ends 191 are free to travel respectively in slots 193 and 192. After this adjustment has been made, it is secured by tightening the screws 194.

Base 140 and top 142 preferably consist of magnetic jig block material in which case each is composed of a body of material case or molded around uniformly distributed inserts 204 of opposite magnetic character. The non-magnetic material may consist of a suitable metal or a plastic composition. With such a construction, the angle generator may be mounted on a magnetic chuck or on a work surface and energized to hold the work magnetically on the top platen 142. For angles beyond the range of the adjustable platen 142, magnetic jig blocks may be mounted on the platen for holding the work. It is not essential that the angle generator be made of magnetic jig block material and in such case, the work would be held on the top plat 142 by conventional positive means. For this purpose there are provided key slots 205, screw holes 206 and dowel holes 207.

When the generator is used in a grinding operation or near a grindstone, the adjusting mechanisms should be shielded from emery dust by a dust guard of any suitable or conventional form.

Although specific embodiments of the invention have been illustrated and described, it will be understood that various alterations in the details of construction may be made without departing from the scope of the invention, as indicated by the appended claims.

What I claim is:

1. An angle generator comprising a fixed member and another member rotatably mounted thereon, gauging members carried respectively by said fixed and rotatable members for the insertion of measuring devices therebetween, one of said gauging members being rotatably mounted and having each a straight edge adapted to be brought into parallelism with each other.

2. An angle generator comprising a fixed member and another member rotatably mounted thereon, gauge retainers carried respectively by said members, and gauging members mounted in said retainers, said gauging members being equidistant from the axis of rotation of said rotatable member, whereby the linear distance between said gauging members is a function of the angular distance therebetween, said gauging members being rotatable in said retainers and formed each with a straight edge of surface adapted to be set parallel to each other for the insertion of gauge blocks in any adjustment of said rotatable member.

3. An angle generator comprising a fixed member and another member rotatably mounted thereon, gauge retainers carried respectively by said members, and gauging members mounted in said retainers, said gauging members being equidistant from the axis of rotation of said rotatable member, whereby the linear distance between said gauging members is a function of the angular distance therebetween, said rotatable member being formed with a concentric groove, and a lever pivoted to said fixed member and having a flange received loosely in said groove and adapted to be locked in said groove on turning said lever.

4. An angle generator comprising a fixed member and another member rotatably mounted thereon, gauge retainers carried respectively by said members, and gauging members mounted in said retainers, said gauging members being equidistant from the axis of rotation of said rotatable member, whereby the linear distance between said gauging members is a function of the angular distance therebetween, said gauging members being axially apertured, and straight-edged gauging pins adapted for insertion in said apertures.

5. An angle generator comprising a fixed member and another member rotatably mounted thereon, gauging members carried respectively by said fixed and rotatable members for the insertion of measuring devices therebetween, said rotatable member being formed with a groove concentric with its center of rotation, and a lever pivoted to said fixed member and having a flange received loosely in said groove and adapted to be locked in said groove on turning said lever.

DAVID JONES.